United States Patent [19]
Jones

[11] Patent Number: 5,282,513
[45] Date of Patent: Feb. 1, 1994

[54] THERMALLY STABLE POLYCRYSTALLINE DIAMOND DRILL BIT

[75] Inventor: Kenneth W. Jones, Kingwood, Tex.

[73] Assignee: Smith International, Inc., Houston, Tex.

[21] Appl. No.: 830,827

[22] Filed: Feb. 4, 1992

[51] Int. Cl.$^5$ .................. E21B 10/46; E21B 10/60
[52] U.S. Cl. .................. 175/434; 175/430; 175/431; 175/432; 175/393; 76/108.4
[58] Field of Search ............. 175/434, 435, 430, 431, 175/432, 433, 393, 420.2; 51/307; 76/108.2, 108.4, 108.6

[56] References Cited

U.S. PATENT DOCUMENTS

| | | | |
|---|---|---|---|
| 3,027,952 | 4/1962 | Brooks | 175/43 X |
| 3,709,308 | 1/1973 | Rowley et al. | 175/434 |
| 3,747,699 | 7/1073 | Feenstra et al. | 175/43 X |
| 3,938,599 | 2/1976 | Horn | 175/43 X |
| 4,491,188 | 1/1985 | Grappendorf | 175/430 |
| 4,515,226 | 5/1985 | Mengel et al. | 175/57 |
| 4,529,047 | 7/1985 | Meskin et al. | 175/430 |
| 4,586,574 | 5/1986 | Grappendorf | 175/434 |
| 4,607,711 | 8/1986 | Zijshing | 175/431 |
| 4,673,044 | 6/1987 | Bigelow et al. | 175/430 |
| 4,744,427 | 5/1988 | Grappendorf | 175/430 |
| 5,025,873 | 6/1991 | Cerkovnik | 175/431 |

Primary Examiner—Stephen J. Novosad
Attorney, Agent, or Firm—Robert G. Upton

[57] ABSTRACT

A diamond drag type drill bit for drilling in an earthen formation consists of a body forming a first cutting end formed from a matrix material and a second open threaded pin end. The first cutting end consists of a multiplicity of substantially radially disposed ridges and flow channels formed by the matrix material. The flow channels intersect a fluid discharge port and radially extend outwardly toward a peripheral edge formed by the cutter end. The ridges contain, along their apical, radially extended edges, a multiplicity of essentially equidistantly spaced diamond cutters having each of their cutting edges formed therein aligned substantially along the apical edge. The space between each diamond cutter contains a metallic filler material aligned along the apical edge that is less hard than either the diamond or the supporting matrix material forming the first cutting end of the drag bit. The filler material wears away rapidly during operation of the bit in the earthen formation allowing the diamond cutters to protrude an extent necessary to obtain optimum formation cutting rates.

15 Claims, 3 Drawing Sheets

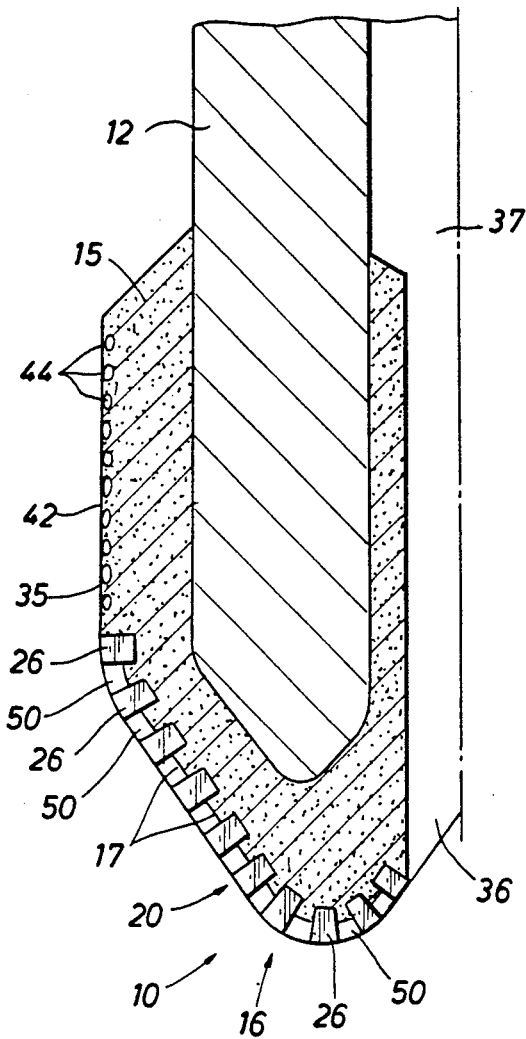
FIG. 3
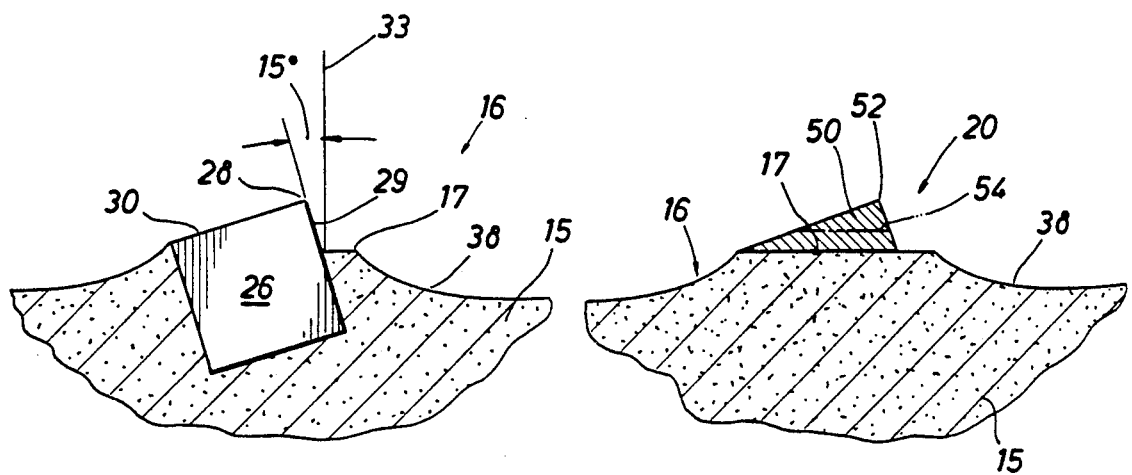
FIG. 4
FIG. 5

THERMALLY STABLE POLYCRYSTALLINE DIAMOND DRILL BIT

BACKGROUND OF THE INVENTION

I. Field of the Invention

The present invention concerns the manufacture and use of polycrystalline diamond drilling bits.

More specifically, it is a means to produce drilling bits using thermally stable diamonds (hereinafter called TSP cutters) that are more predictable and cost effective than state of the art TSP cutter drill bits.

II. Description of the Prior Art

A typical prior art TSP cutter diamond bit is manufactured by forming a cavity in a suitable refractory material mold cavity (i.e. graphite) that is the mirror image of the desired finished product. The TSP cutters are then temporarily affixed with an adhesive in circumferentially placed vee shaped grooves formed in the mold. The entire bit head is then fabricated with materials and by technology well known in the diamond bit industry.

One typical example of prior art, Pat. No. 4,491,188 teaches a method for TSP cutter placement in circumferential V-groove segments in the aforesaid mold cavity The TSP cutters are basically triangular prisms. The cutter is positioned in the mold with a triangular face forward in the direction of rotation of the finished bit. An apical edge of the triangular prism is placed concurrent with the circumferentially oriented v-groove. The depth of the v-groove is such that the TSP cutter protrudes on the finished bit somewhat more than need be for optimum cutter strength and drilling fluid control. This is because the 60° apical angle of the TSP cutter is very fragile and a portion of the cutting tip of somewhat unpredictable dimension is quickly broken or worn off as the bit is rotated at the bottom of the borehole.

To ensure that too large a portion of the TSP cutter is not broken off in shear, matrix back-up metal is formed in front of the leading and behind the trailing faces of the TSP cutter.

The following Pat. Nos. 4,529,047; 4,673,044; 4,744,427; 4,586,574 and 4,515,226, all teach basically the same triangular prisms as cutting elements positioned in circumferential v-groove segments with matrix metal back-up. All bits made to the specifications of the aforesaid patents, as well as Patent No. 4,491,188, have the same unpredictable "breaking-in" time and results, which can have severe deleterious effects on the drilling fluid flow velocities across the cutting structure. This unpredictable cutter height breakage results in uneven cutter loading with subsequent selective wear which leads to termination of the bit run.

In summary, the foregoing patents provide evidence of intense efforts in the prior art to develop a TSP cutter bit that overcomes some of the inadequacies described. Specifically, there is need in the art for thermally stable diamond drag bits that do not require a break-in period and the drilling fluid is controlled to a degree that diamond wear is an insignificant problem.

SUMMARY OF THE INVENTION

It s an object of the present invention to provide a diamond drag bit which has improved operating life, wear characteristics and drilling rates.

It is another object of the present invention to provide a TSP cutter drag bit with cutter protrusion that remains relatively constant during use to permit optimum use of hydraulic energy.

It is yet another object of the present invention to provide a TSP cutter drag bit with cutters that remain sharp for an overall higher drilling rate than attainable by prior art bits.

It is still yet another object of the present invention to provide a TSP cutter drill bit constructed to provide optimum protection from impact damage to the cutters.

The foregoing objects are attained by a drag type bit which has a pin end adapted for being removably attached to the drill string, and a bit body attached to the pin end. The bit body has an internal cavity in fluid communication with the drill string to receive a supply of drilling fluid therefrom. A fluid discharge port (crow-foot) is positioned at or near the center of the bit cutting face and is coupled to the internal fluid cavity of the body. This port supplies fluid to clean and cool the TSP cutters and the bit face. It then exits at the outside diameter gage surface carrying the drill cuttings up the annulus formed between the drill pipe and the borehole wall.

The fluid flow system of the present invention is radial flow. For this type of flow, radial v-shaped grooves are formed in the refractory, i.e. graphite mold cavity in which the bit head will be cast. The depth of these grooves is the required protrusion of the TSP cutters on the finished product. The leading side of the v-groove is at angles tilted forwardly in reference to a plane coincident with and parallel to the vertical axis of the mold from 5° to 30° inclusive, with 5° to 20° being the preferred range of angles depending upon the rock characteristics. The trailing side of the v-groove is tilted upward from 5° through 30° inclusive with 50° to 20° being the preferred range of angles. The grooves can be continuous from the center or thereabouts of the drilling fluid source to the outside diameter or gage surface of the mold cavity. There may also be discontinuities that are advantageous for certain fluid flow distribution needs.

The TSP cutters are positioned in the grooves in the mold in a predetermined pattern predicated on the rock properties to be drilled. A multiplicity of TSP cutters are strategically positioned in a spaced apart relationship and temporarily glued in the apex of the groove with an edge of, for example, a polyhedron contacting the apex of the groove. The TSP cutters may however be shaped in a hexahedron, right square parallelepiped, right rectangular parallelepiped, right cylinder or any other polyhedron that has at least two planes intersecting at an angle between 70° and 90° with an edge or a corner contacting the apex of the groove. The cutters are placed with a plane that forms part of an edge or corner of the polyhedron coincident with the leading face of the groove which is tilted forwardly in the direction of rotation of the finished bit. As stated before, the forward tilt of the cutter plane in the groove is between 5° and 30° inclusive, with 5° to 20° being the preferred range of angles.

The TSP cutters are temporarily affixed (glued) in the radial groove of the mold with a predetermined axial clearance between each TSP cutter. To ensure the cutter will have the necessary protrusion on the finished bit head cutting face to provide the correct depth of cut and formation clearance and the bit body for adequate fluid flow and drill cuttings removal, short lengths of mild steel rod or bars having a cross section dimension equal to the required cutter protrusion, are positioned adjacent to or in close proximity between each TSP cutter.

If greater fluid escape area is needed for a certain hydraulic condition, refractory strips of calculated dimensions are affixed (glued) in the mold between the rows of grooves starting at the center and traversing radially across the drilling face to terminate at the mold outside diameter.

The mold cavity with the TSP cutters and intermediate filler rods fixed in the mold is subsequently loaded with tungsten carbide powder with a typical steel shank bit body complete with a threaded pin end embedded in the powder. The "loaded" mold is then placed in a furnace and infiltrated with an appropriate brazing alloy. This process is well known in the diamond bit manufacturing industry. When the bit head with the attached steel shank is cooled, it is removed from the female mold and cleaned by grit blasting or a similar process.

The cast matrix bit head of the preferred embodiment has a center downport for fluid discharge and v-shaped ridges emanating from about the bit head center and radially crossing the bit face to terminate at the top portion of the outside diameter of the bit. These ridges have an approximately 90 degree included angle and are tilted rearwardly from the direction of bit rotation from 5° to 30°, and preferably 5° to 20°. These ridges have the TSP cutters embedded therein, the cutters being oriented to the same angles as the ridge. The steel spacers are preferably brazed between each diamond cutter.

When the finished bit is rotated on the bottom of the well bore, the steel spacers between the TSP cutters wear away very rapidly to the depth that is consistent with the modulus of elasticity of the rock formation being drilled. This exposes the cutters, which have a negative back rake clearance angle from 5° to 30° with 5° to 20° giving optimum strength and shearing action on the rock formations being drilled.

A diamond drag type drill bit for drilling in an earthen formation consists of a body forming a first cutting end formed from a matrix material and a second open threaded pin end. The body further forms a plenum chamber adapted to receive drilling fluid routed through a threadably attachable drill string. At least one discharge port is formed by the first cutting end. The discharge port is in fluid communication with the plenum chamber.

The first matrix cutting end consists of a multiplicity of substantially radially disposed ridges that form a leading surface, a heel surface and a trailing surface. Flow channels are formed between each of the ridges formed in the matrix material. The flow channels intersect the discharge port and radially extend outwardly toward a peripheral edge formed by the cutter end. The ridges contain, along their leading, radially extended surfaces, a multiplicity of essentially equidistantly spaced diamond cutters embedded within the matrix material and having each of their cutting edges formed by the cutters extend beyond the leading surface of the ridge forming an apical edge thereby. The diamond cutter may be formed from synthetic diamond, thermally stable cubes. The space formed between each extended diamond cutter and a surface of the matrix material contains a metallic filler material aligned along the apical edge that is less hard than either the diamond or the supporting matrix material forming the first cutting end of the drag bit. The filler material rapidly wears away during operation of the bit in the earthen formation allowing the diamond cutters to protrude an extend necessary to obtain optimum formation cutting rates and dispersion of drilling fluid for maximum bit penetration.

An advantage then of the present invention over the prior art is to provide a diamond drag bit with a cutter protrusion that remains relatively constant during use thereby permitting optimum use of hydraulic energy.

Another advantage of the present invention over the prior art is to provide diamond cutters that remain sharp for an overall higher drilling rate than state of the art diamond drag bits.

It is yet another advantage of the present invention over the prior art to construct a diamond cutter drill bit to provide optimum protection from impact to the diamond cutters.

The above noted objects and advantages of the present invention will be more fully understood upon a study of the following description in conjunction with the detailed drawings.

BRIEF DESCRIPTION OF THE DRAWINGS

FIG. 3 is a cross-sectional view taken through 3—3 of FIG. 2;

FIG. 4 is a partially broken away sectional view of one of the diamond cutters taken through 4—4 of FIG. 2, and FIG. 5 is a partially broken away sectional view of the metallic filler material placed between each of the spaced diamond cutters taken through 5—5 of FIG. 2.

Figure 1:
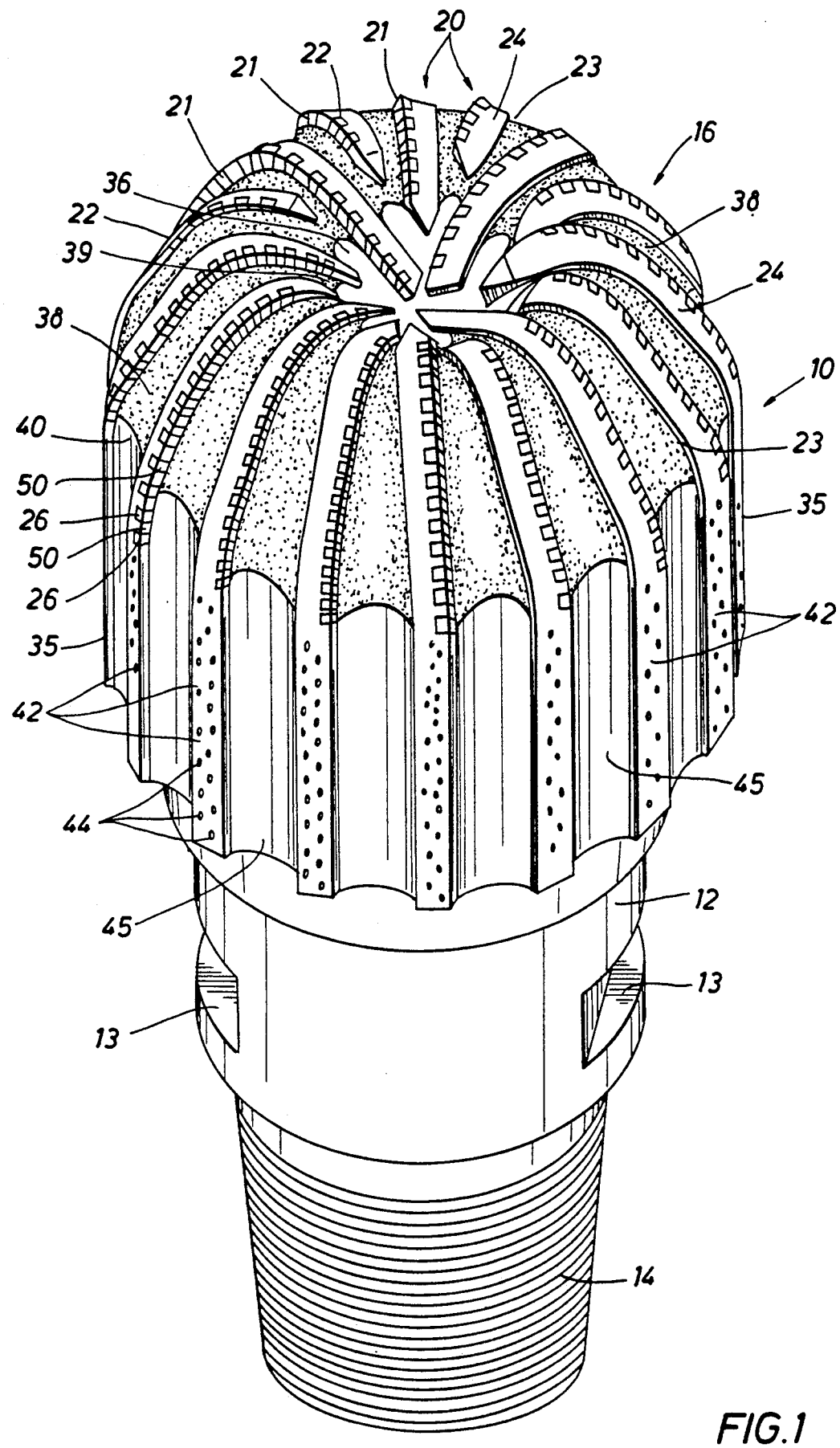
FIG. 1 is a perspective view of a preferred embodiment of a diamond drag bit of the present invention.

DESCRIPTION OF THE PREFERRED EMBODIMENTS AND BEST MODE FOR CARRYING OUT THE INVENTION

The thermally stable polycrystalline diamond drill bit generally designated as 10 consists of a bit body 12, threaded pin end 14 and a matrix cutter end generally designated as 16. The body or shank 12 of the bit 10 forms a pair of tool slots 13 to facilitate attachment or removal of the bit from a drill string (not shown).

Matrix cutter head 16 comprises a series of radially disposed ridges generally designated as 20 divided by flow channels 38. Each of the radially directed flow channels leads from a fluid discharge port 36 formed by matrix cutter end 16. The flow channels transition into radially aligned flow channels 45 formed between parallel ridges 42 positioned on gage 35. Gage 35 defines the outer diameter of the bit 10. Each ridge 20 forms a leading edge surface 21, a heel surface 24 and a trailing edge surface 23. An apex 22 is formed between the leading edge surface 21 and the heel surface 24. The leading edge surface 21, facing the direction of rotation of the drag bit, is slanted rearwardly from 5° to 30° in reference to a plane 33 coincident with and parallel to a vertical axis of the bit 10 (see FIG. 4). The preferred range of angles being 5° to 20°. The heel surface 24 is angled downwardly from 95° to 120° with respect to plane 33 with a preferred range of angles being 95° to 10°.

A multiplicity of, for example, polyhedron cubes of TSP cutters 26 are strategically positioned and spaced one from the other, along the leading edge surface 21 of ridge 20. A cutting edge 28 of the diamond cube 26 is in alignment with apex 22 formed in ridge 20. Face 29 and heel surface 30 of diamond cube 26 is co-planar with leading edge surface 21 and heel surface 24 of ridge 20.

The space that is formed between each of the exposed diamond cubes 26 protruding from surface 17 of the matrix cutter head 16 (FIG. 4) is preferably filled with a mild steel material 50; an apex 52 of the steel being aligned with both the cutting edge 28 of the TSP cutter and apex 22 of ridge 20. The mild steel spacer material is, for example, brazed to the matrix surface 17 and to the diamond cube cutters 26.

As heretofore described, the steel filler material is rapidly worn or eroded (or both) away during operation of the drag bit 10 in an earthen formation. The depth of the space between TSP cutters is determined by the type of formation the bit is to penetrate and the pre-determine amount of drilling fluid to be passed over the face of the bit.

Figure 2:
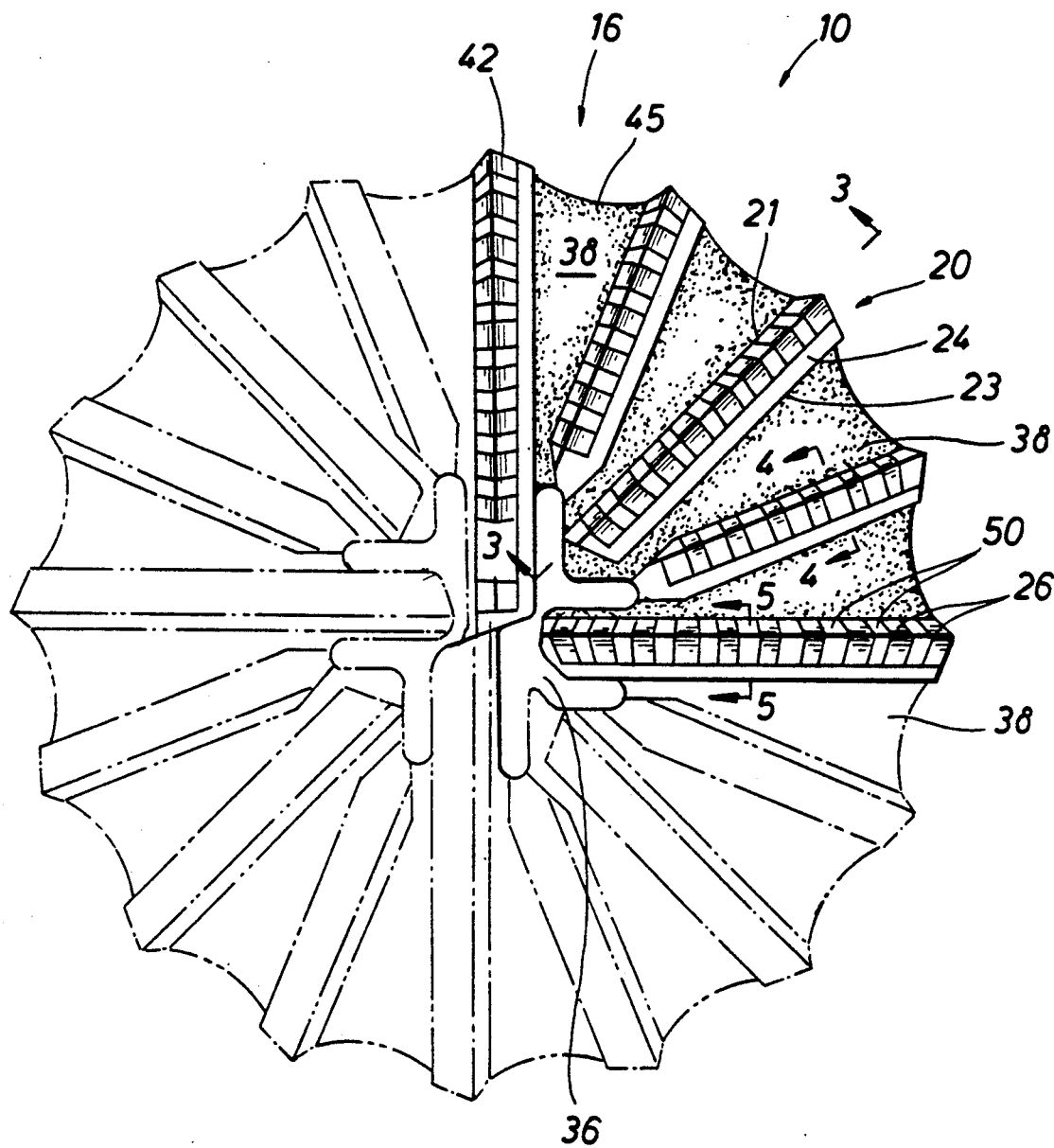
FIG. 2 is an end view, partially in phantom, of the diamond drag bit of FIG. 1.

Turning now to FIG. 2, the radial disposition of each of the ridges 20 and channels 38 is readily apparent. The TSP cubes 26 are substantially equidistantly spaced along each of the ridges 20 with the steel filler material 50 positioned therebetween. The apex then of the ridge consisting of cutting edge 28 of cube 26 and apex 52 of the steel filler 50. The combination then of the diamond and steel elements being aligned with leading edge surface 21 of the ridge 20.

The section of FIG. 3 depicts the steel shank or body 12 metallurgically attached to the tungsten carbide matrix 15 that forms cutter head 16. The plenum chamber 37 directs drilling fluid through discharge port 36 radially outwardly along channels 38 formed in cutter end 16. The TSP cubes 26 and steel filler material being aligned along leading edge face 21 of ridge 20. Natural diamonds are, for example, imbedded in ridges 42 paralleling the axis 34 of the drag bit 10. The natural diamonds positioned on the outer diameter of the bit helps to maintain the gage 35 assuring a uniform diameter of the borehole.

With reference now to FIG. 4, the TSP cube is shown imbedded in matrix 15. Face 29 of the diamond is angled rearwardly 15 degrees from plane 33 and faces in the direction of bit rotation. The heel 30 of the cutter then angles downwardly 95° to 120° from plane 33 and conforms generally to surface 24 of ridge 20. Cutting edge 28 is coincident with apex 22 of ridge 20. As mentioned before, each diamond cube is secured within matrix 15 at a depth determined by the grooves formed in the female mold (not shown). This well known process determines the extent to which the cutting edge 28 protrudes beyond surface 17 of the matrix material 15.

FIG. 5 depicts the filler material (preferably mild steel) that fills the void between the protruding cutters 26. The steel, for example, may be brazed in place to surface 17 of matrix 15, apex 52 being aligned with each of the cutting ends 28 of the TSP cubes 26. As the steel material rapidly wears (since it is softer than both the matrix 15 and the diamond) while operating in an earthen formation (54) the diamond cutting tip is protected as it subsequently seeks optimum penetration thereby preventing catastrophic and premature failure of the drag bit.

The worn groove 54 now serves to direct fluid and detritus through the newly worn groove thereby enhancing cooling and cleaning of the diamond cutters and bit face.

It will of course be realized that various modifications can be made in the design and operation of the present invention without departing from the spirit thereof.

Thus, while the principal preferred construction and mode of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A diamond drag type drill bit for drilling in an earthen formation comprising;

a body forming a first cutting end formed from a matrix material and a second open threaded pin end, said body further forming a plenum chamber adapted to receive drilling fluid routed through a threadably attachable drill string, at least one discharge port is formed by said first cutting end, said discharge port being in fluid communication with said plenum chamber, said first cutting end formed of said matrix material consists of a multiplicity of substantially radially disposed ridges forming a leading surface, a heel surface and a trailing surface with flow channels formed therebetween, the flow channels intersect said discharge port and radially extend outwardly toward a peripheral edge formed by said cutter end, said ridges contain, along their leading, radially extended surfaces, a multiplicity of substantially equidistantly spaced diamond cutters embedded within said matrix material and having each of their cutting edges formed by said cutters extend beyond said leading surface of said ridge forming an apical edge thereby, and the space formed between each extended diamond cutter and a surface of said matrix material contains a filler material aligned along said apical edge that is less hard than either the diamond or the supporting matrix material forming the first cutting end of the drag bit, said filler material rapidly wears away during operation of the bit in said earthen formation allowing the diamond cutters to protrude an extent necessary to obtain optimum formation cutting rates and dispersion of drilling fluid for maximum bit penetration.

2. The invention as set forth in claim 1 wherein the diamond cutters are formed from synthetic polycrystalline diamond material.

3. The invention as set forth in claim 2 wherein said synthetic polycrystalline diamond material is thermally stable.

4. The invention as set forth in claim 3 wherein said thermally stable diamonds are polyhedron cubes.

5. The invention as set forth in claim 1 wherein said filler material is mild steel.

6. The invention as set forth in claim 5 wherein said mild steel filler material fills the interstices formed between each of the diamond cubes and is metallurgically bonded between edges of said diamond cubes and a surface formed by said matrix material, a leading surface of the steel forms an apical edge that is coincident with the apical edge of said diamond cubes.

7. The invention as set forth in claim 6 wherein said steel is brazed to said edges of said diamond and surface of said matrix material.

8. The invention as set forth in claim 7 wherein a cutting surface formed by said diamond cube is coincident with said leading surface of said ridge, the cutting surface is angled rearwardly relative to a plane parallel with an axis of the drag bit from 5° to 30°.

9. The invention as set forth in claim 8 wherein the cutting face of the diamond is angled rearwardly from 5° to 20°.

10. The invention as set forth in claim 9 wherein a heel surface formed by the diamond cube is coincident with said heel surface formed by the ridge, said diamond heel surface is angled downwardly relative to a plane parallel to the axis of the bit from 95° to 120°.

11. A process for imbedding a multiplicity of thermally stable polycrystalline diamond cutters in a leading surface of one or more radially disposed ridges formed in a matrix cutter head of a diamond drag bit, said matrix cutter head further forming one or more drilling fluid flow channels adjacent said ridges, the process comprising the steps of;

positioning strategically in a spaced relationship each of said diamond cutters in said leading surface of said ridge, a cutting edge of the cutters forming an apical edge along said radially disposed ridge, each of said cutters extending beyond a surface of said matrix cutter head thereby forming interstices between each of the protruding cutters, filling said interstices between cutters with a filler material less hard than either the matrix material or the diamond, the filler material forming an edge coincident with said apical cutting edge of said diamond, and wearing away said filler material during operation of said drag bit in an earthen formation thereby allowing the diamond cutters to protrude an extent necessary to obtain optimum formation cutting rates and dispersion of drilling fluid for maximum bit penetration.

12. The process as set forth in claim 11 further comprising the step of forming the diamond cutters into polyhedron cubes.

13. The process as set forth in claim 12 further comprising the step of angling a cutting surface of said cube that is coincident with said leading surface of the ridge rearwardly from 5° to 30° relative to a plane parallel with an axis of the drag bit.

14. The process as set forth in claim 11 wherein the filler material is formed from mild steel.

15. The process as set forth in claim 14 further comprising the step of brazing the steel filler material to a surface formed by the matrix head and a side of each diamond cutter forming the interstices between cutters.

* * * * *